United States Patent
Lee et al.

(10) Patent No.: US 12,053,796 B2
(45) Date of Patent: Aug. 6, 2024

(54) MULTI-SLOT DIE COATER

(71) Applicant: LG Energy Solution, Ltd., Seoul (KR)

(72) Inventors: Taek-Soo Lee, Daejeon (KR);
Young-Gon Kim, Daejeon (KR);
Shin-Wook Jeon, Daejeon (KR);
Sang-Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/917,394

(22) PCT Filed: Jul. 16, 2021

(86) PCT No.: PCT/KR2021/009213
§ 371 (c)(1),
(2) Date: Oct. 6, 2022

(87) PCT Pub. No.: WO2022/015117
PCT Pub. Date: Jan. 20, 2022

(65) Prior Publication Data
US 2023/0226570 A1    Jul. 20, 2023

(30) Foreign Application Priority Data
Jul. 16, 2020 (KR) .................. 10-2020-0088356

(51) Int. Cl.
*B05C 5/02*    (2006.01)
*B05C 1/08*    (2006.01)

(52) U.S. Cl.
CPC .............. *B05C 5/0254* (2013.01); *B05C 1/08* (2013.01)

(58) Field of Classification Search
None
See application file for complete search history.

(56) References Cited

U.S. PATENT DOCUMENTS

| | | | | |
|---|---|---|---|---|
| 4,492,850 A | * | 1/1985 | Yasuda | B23K 35/0205 219/69.15 |
| 4,863,765 A | * | 9/1989 | Ishizuka | G03C 1/74 118/410 |
| 5,275,660 A | * | 1/1994 | Ozaki | C04B 35/111 118/325 |

(Continued)

FOREIGN PATENT DOCUMENTS

| CN | 1496577 A | 5/2004 |
|---|---|---|
| CN | 101457358 A | 6/2009 |

(Continued)

OTHER PUBLICATIONS

English translation for JP2001345096.*

(Continued)

*Primary Examiner* — Charles Capozzi
(74) *Attorney, Agent, or Firm* — Lerner David LLP (57) ABSTRACT

A multi-slot die coater which can improve a problem of structural vulnerability to deformation and torsion. The multi-slot die coater including a lower slot and an upper slot includes a lower die block; an intermediate die block disposed on the lower die block to form the lower slot therebetween; and an upper die block disposed on the intermediate die block to form the upper slot therebetween, wherein at least one of the lower die block, the intermediate die block, and the upper die block includes a metal coating layer on a ceramic body.

11 Claims, 8 Drawing Sheets

(56) References Cited

U.S. PATENT DOCUMENTS

| | | | |
|---|---|---|---|
| 5,336,322 A | 8/1994 | Tobisawa | |
| 5,376,178 A * | 12/1994 | Sato | B05C 5/0254 |
| | | | 118/410 |
| 5,421,085 A | 6/1995 | Muscato et al. | |
| 5,425,967 A | 6/1995 | Tomaru | |
| 5,465,879 A * | 11/1995 | La | B05C 11/1034 |
| | | | 222/525 |
| 5,876,804 A * | 3/1999 | Kodama | B29C 48/11 |
| | | | 427/282 |
| 6,319,316 B1 * | 11/2001 | Gibson | B05C 5/0254 |
| | | | 118/410 |
| 2003/0087038 A1 * | 5/2003 | Su | D21H 27/001 |
| | | | 427/407.1 |
| 2003/0118731 A1 | 6/2003 | He et al. | |
| 2006/0096528 A1 | 5/2006 | Kawatake et al. | |
| 2008/0318071 A1 | 12/2008 | Holzheimer et al. | |
| 2018/0250701 A1 * | 9/2018 | Kuenne | B29C 48/302 |
| 2018/0333684 A1 | 11/2018 | Lee | |
| 2022/0016665 A1 | 1/2022 | Lee et al. | |

FOREIGN PATENT DOCUMENTS

| | | |
|---|---|---|
| CN | 202356243 U | 8/2012 |
| CN | 102776478 A | 11/2012 |
| JP | H06121953 A | 5/1994 |
| JP | H06296917 A | 10/1994 |
| JP | 2547972 B2 | 10/1996 |
| JP | 2001345096 A * | 12/2001 |
| JP | 2002025051 A | 1/2002 |
| JP | 3291067 B2 | 6/2002 |
| JP | 2003080148 A | 3/2003 |
| JP | 2005296828 A | 10/2005 |
| JP | 2015107446 A | 6/2015 |
| KR | 100858889 B1 | 9/2008 |
| KR | 20100011571 U | 11/2010 |
| KR | 20170079777 A | 7/2017 |
| KR | 20200035642 A | 4/2020 |
| KR | 20200037662 A | 4/2020 |
| WO | 2008/141820 A1 | 11/2008 |

OTHER PUBLICATIONS

International Search Report for Application No. PCT/KR2021/009213 mailed Oct. 5, 2021, 2 pages.

Extended European Search Report for Application No. 21843308.4 dated Sep. 20, 2023. 8 pgs.

* cited by examiner

FIG. 1

RELATED ART

FIG. 2

RELATED ART

OCCURRENCE OF LEAKING

MULTI-SLOT DIE COATER

CROSS-REFERENCE TO RELATED APPLICATIONS

This application is a national phase entry under 35 U.S.C. § 371 of International Application No. PCT/KR2021/009213, filed Jul. 16, 2021, which claims priority from Korean Patent Application No. 10-2020-0088356 filed on Jul. 16, 2020, the disclosures of which are incorporated herein by reference.

TECHNICAL FIELD

The present disclosure relates to a multi-slot die coater capable of simultaneously forming two or more layers by wetting. In particular, the present disclosure relates to a multi-slot die coater that has improved a deformation and torsion inevitably caused by a structural feature including a thin die block.

BACKGROUND ART

As technology development and demand for mobile devices increase, the demand for secondary batteries as an energy source is rapidly increasing, and such secondary batteries essentially include an electrode assembly which is a power generation element. The electrode assembly has a form in which a positive electrode, a separator, and a negative electrode are stacked at least once, and the positive electrode and the negative electrode are prepared by coating and drying a positive electrode active material slurry and a negative electrode active material slurry on current collectors made of aluminum foil and copper foil, respectively. In order to equalize charging/discharging features of secondary batteries, the positive electrode active material slurry and the negative electrode active material slurry should be uniformly coated on the current collectors, and a slot die coater is conventionally used therefor.

In an electrode manufacturing method using a slot die coater, an electrode active material slurry discharged from the slot die coater is applied on a current collector transferred by a coating roll. The conventional slot die coater includes two dies and forms a slot between the two dies, and may form an electrode active material layer of one layer by discharging one type of electrode active material slurry through a single slot.

In order to manufacture a secondary battery of high energy density, the thickness of the electrode active material layer which was about 130 μm gradually increased to reach 300 μm. When the thick electrode active material layer is formed with the conventional slot die coater, since migration of a binder and a conductive material in the active material slurry deepens during drying, a final electrode is manufactured non-uniformly. In order to solve this problem, when coating is performed two times such as applying thinly and drying the electrode active material layer and then applying and drying the electrode active material layer, a disadvantage is that it takes a long time. In order to simultaneously improve electrode performance and productivity, the inventors of the present disclosure have proposed a dual slot die coater capable of simultaneously applying two types of electrode active material slurries.

Figure 1:
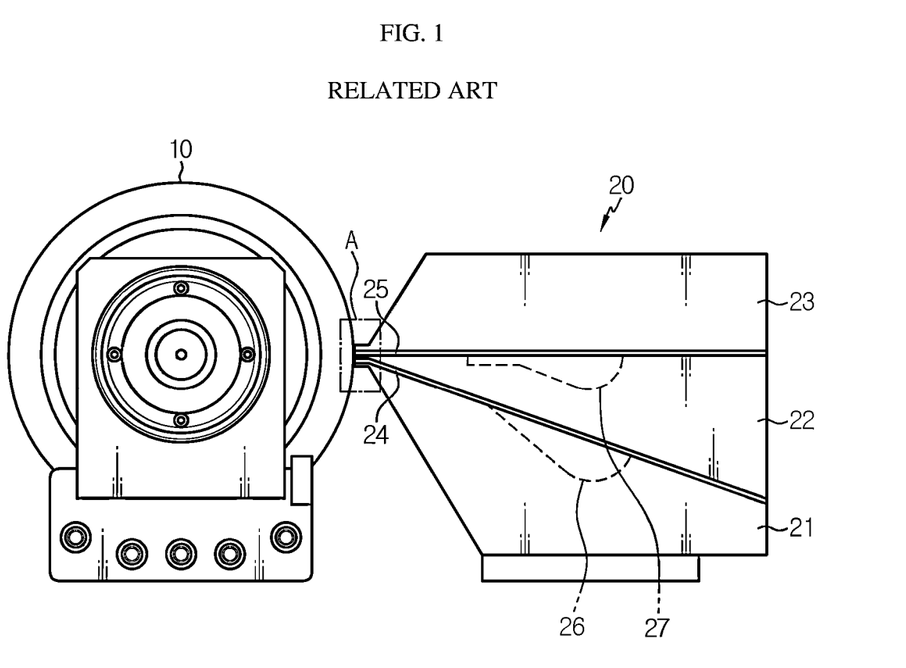
FIG. 1 is a schematic cross-sectional view of a dual slot die coater according to the conventional art.

FIG. 1 shows an example of a coating method using such a dual slot die coater.

Two types of electrode active material layers may be simultaneously formed on a current collector (not shown) by discharging two types of electrode active material slurries from a dual slot die coater 20 while allowing the current collector to travel by rotating a coating roll 10. The electrode active material slurries discharged from the dual slot die coater 20 are widely applied to one surface of the current collector to form the electrode active material layers.

The dual slot die coater 20 is configured by assembling three plate member, that is, three die blocks 21, 22, and 23. Two slots are formed because the slots are formed between the die blocks adjacent to each other, and by simultaneously discharging two types of electrode active material slurries through discharge ports 24 and 25 communicatively connected to the respective slots, electrode active material layers of two layers may be simultaneously formed by continuously applying an additional electrode active material slurry on an electrode active material layer formed by a previously applied electrode active material slurry. Reference numerals 26 and 27 denote manifolds in which coating solutions are contained.

Since a process using the dual slot die coater 20 should use electrode active material slurries simultaneously discharged from the different discharge ports 24 and 25, it is quite difficult to form each electrode active material layer to a desired thickness.

In general, since the thickness of each electrode active material layer is affected by the discharge amount of each of electrode active material slurries through the discharge ports 24 and 25, and the discharge amount of each of electrode active material slurries is greatly affected by the size (a slot gap) of each of the discharge port 24 and 25, in order to produce a desired thickness, it is necessary to repeat a task of disassembling and reassembling each of the die blocks 21, 22, and 23 while experimentally performing a coating process several times to adjust the slot gap and check the discharge amount again. However, this slot gap is not only a variable that is adjusted sensitively enough to change greatly even according to the fastening strength of bolts used for assembling between the die blocks 21, 22, and 23, but also may be changed even by the force through which the electrode active material slurry is discharged. In particular, in order to stably perform uniform application in a width direction (transverse direction (TD)) with respect to a traveling direction (machine direction (MD)) of the current collector, uniform dimension accuracy in the width direction is required. Since the width of the dual slot die coater 20 also increases in order to use a current collector of a long width for an increase in productivity, it is more difficult to uniformly control the slot gap in the width direction.

However, since the slot die coater 20 basically includes the three die blocks 21, 22, and 23, in order to configure a device having a foot print and volume similar to the conventional slot die coater including one slot, the thickness of each of the die blocks 21, 22, and 23 must be thin, and for this reason, there is a problem of being structurally vulnerable to deformation and torsion inevitably. When deformation or torsion occurs, the painstakingly adjusted slot gap is twisted, which is a serious problem of causing defects in the electrode process. Furthermore, in a multi-slot die coater in which the number of die blocks is further increased by including two or more slots, this problem will become more serious.

In order to solve this problem, when the size of each of the die block 21, 22, and 23 is increased (change in the angle), a discharge direction is changed, which causes deterioration of coating process ability. And, even if deformation and torsion are improved by increasing the thickness of each of the die blocks 21 and 23 located outside among the three die blocks 21, 22, and 23, supplementation of deformation of the die block 22 which is structurally weakest and located halfway is still a difficult problem.

Figure 2:
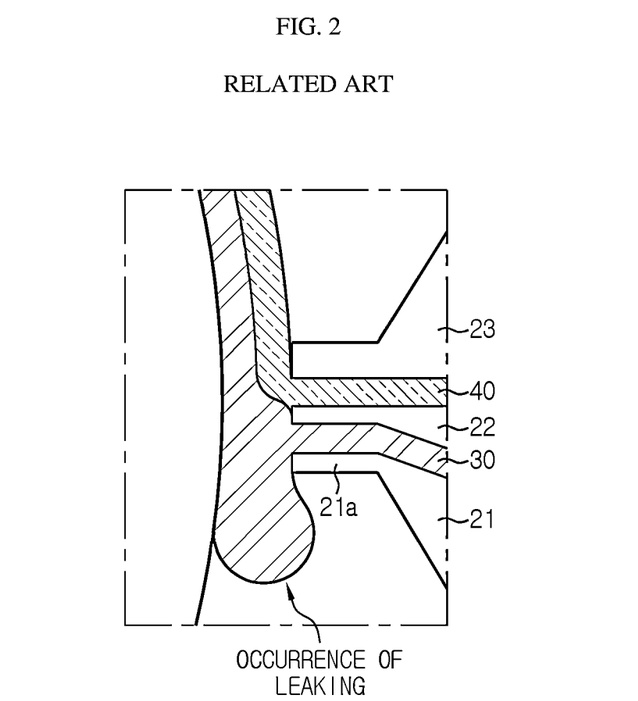
FIG. 2 is an enlarged view of area A of FIG. 1.

Meanwhile, FIG. 2 is an enlarged view of area A of FIG. 1. Referring to FIG. 2, by simultaneously discharging two types of electrode active material slurries 30 and 40 through two slots formed between the three die blocks 21, 22, and 23 adjacent to each other and the discharge ports 24 and 25 communicatively connected to the two slots, the additional electrode active material slurry 40 may be continuously applied on the previously applied first electrode active material slurry 30.

However, a coating process using the dual slot die coater 20 has problems such as leaking, bead breakup, ribbing, etc. because electrode active material slurries are simultaneously discharged from the different discharge ports 24 and 25. Among these, leaking means instability in which part of a coating solution is lost outside a die lip 21a to an upstream side, as shown in FIG. 2. This means loss of a previously measured coating solution, which makes the final coating thickness unpredictable. Due to such leaking, the coating solution stays for a long time and solidifies, or a deviation in the coating thickness in the width direction is caused.

In particular, when the coating solution is discharged under high pressure with a coating gap (a gap between the coating roll and the die lip) reduced to several hundreds of μm for the purpose of thin film coating or to reduce the thickness deviation of a coating layer in the width direction, the above leaking may be intensified.

Accordingly, in the conventional slot coating process, the initial conditions such as the physical properties of the coating solution, the coating gap, and the flow rate and speed of the coating solution are repeatedly adjusted to prevent leaking as much as possible. However, it is not easy to set the initial conditions, and it takes a long time to find suitable process conditions. Therefore, there is a need for a method of effectively improving these problems.

DISCLOSURE

Technical Problem

The present disclosure is designed to solve the problems of the related art, and therefore the present disclosure is directed to providing a multi-slot die coater capable of improving a problem structurally vulnerable to deformation and torsion in a multi-slot die coater which basically includes three or more die blocks.

In addition, the present disclosure is also directed to providing a multi-slot die coater having an efficient structure capable of further improving the manufacturing process ability of an electrode active material layer using the multi-slot die coater by solving a problem of leaking.

However, the problems to be solved by the present disclosure are not limited to the above problems, and other problems that are not mentioned will be clearly understood by those skilled in the art from the description of the invention described below.

Technical Solution

In one aspect of the present disclosure, there is provided a multi-slot die coater including a lower slot and an upper slot including a lower die block; an intermediate die block disposed above the lower die block to form the lower slot therebetween; and an upper die block disposed above the intermediate die block to form the upper slot therebetween, wherein at least one of the lower die block, the intermediate die block, and the upper die block comprises a metal coating layer on a ceramic body.

The multi-slot die coater may extrude and apply a coating solution on a surface of a continuously traveling base member through at least one of the lower slot and the upper slot, and a portion among the lower die block, the intermediate die block, and the upper die block adjacent to at least a portion from which the coating solution is discharged may include the metal coating layer on the ceramic body.

A groove may be formed in the ceramic body for bolt tap processing for bolt fastening, the metal coating layer may be filled in the groove, and a bolt tap may be formed in the metal coating layer filled in the groove.

The lower die block, the intermediate die block, and the upper die block respectively may include a lower die lip, an intermediate die lip, and an upper die lip forming front end portions thereof, and at least one of the lower die lip, the intermediate die lip, and the upper die lip may include the metal coating layer on the ceramic body.

It is preferable that a ceramic is a transition metal oxide and a metal is SUS.

A lower discharge port communicatively connected to the lower slot is formed between the lower die lip and the intermediate die lip, and an upper discharge port communicatively connected to the upper slot is formed between the intermediate die lip and the upper die lip.

A corner portion of the upper die lip opposed to the intermediate die lip may be chamfered. The corner portion may of the upper die lip be provided in a shape cut obliquely at an angle of 10 degrees to 80 degrees so that the upper die lip comprises an inclined surface.

An angle formed by the lower slot and the upper slot may be 30 degrees to 60 degrees.

The intermediate die block may include a first intermediate die block and a second intermediate die block in face-to-face contact with each other up and down and sliding along a contact surface to be movable relative to each other, the first intermediate die block may be fixedly coupled to the lower die block, and the second intermediate die block may be fixedly coupled to the upper die block.

A predetermined step may be formed between the lower discharge port and the upper discharge port.

The multi-slot die coater may further include a first spacer interposed between the lower die block and the intermediate die block to adjust a width of the lower slot, and a second spacer interposed between the intermediate die block and the upper die block to adjust a width of the upper slot.

The lower die block may include a first manifold configured to accommodate a first coating solution and communicatively connected to the lower slot, and the upper die block may include a second manifold configured to accommodate a second coating solution and communicatively connected to the upper slot.

Advantageous Effects

According to the present disclosure, a multi-slot die coater in which a metal is coated on a body made of a ceramic material which has a better deformation and torsion phenomenon than that of the metal which is a conventional die block material is provided. The multi-slot die coater has an excellent effect of maintaining a slot gap once adjusted. Since deformation or torsion of a die block which is structurally vulnerable due to its thin thickness is improved through a change in the material, it is possible to uniformly form a coating layer, in particular, an electrode active material layer, to a desired thickness, and preferably, simultaneous coating of two types of electrode active material slurries is possible, and thus there are effects that both performance and productivity are excellent.

According to an aspect of the present disclosure, it is possible to improve durability by preventing twisting and deformation of the die block of the multi-slot die coater having a relatively thin thickness compared to the conventional slot die coater including one slot. This has the effect of securing coating process ability and securing reproducibility.

According to another aspect of the present disclosure, by dispersing the pressure of an upper coating solution by applying a chamfer structure to an upper die lip, it is possible to improve the leakage phenomenon toward a lower die lip, thereby improving the coating quality of a product.

According to another aspect of the present disclosure, the process ability of multi-slot coating may be improved by easily adjusting positions of upper and lower discharge ports by relatively moving upper and lower die blocks according to coating process conditions.

When the multi-slot die coater of the present disclosure is used to manufacture an electrode of a secondary battery by applying the electrode active material slurry on a current collector while allowing the current collector to travel, there is an advantage that uniform coating is possible even under high-speed traveling or long-width application conditions.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

A multi-slot die coater according to an embodiment of the present disclosure may include two or more slots. Basically, the multi-slot die coater is an apparatus including a lower slot and an upper slot and coating a coating solution in a double layer on a base member. The 'base member' described below is a current collector and the coating solution is an 'electrode active material slurry'. Both a first coating solution and a second coating solution are electrode active material slurries, and may mean electrode active material slurries that have the same or different composition (types of an active material, a conductive material, and a binder), content (an amount of each of the active material, the conductive material, and the binder), or physical properties. The multi-slot die coater according to an embodiment of the present disclosure is optimized for electrode manufacturing in which coating is performed by simultaneously or pattern-coating is performed by alternately applying two or more types of electrode active material slurries. However, the scope of the present disclosure is not necessarily limited thereto. For example, the base member may be a porous scaffold constituting a separation membrane, and the first coating solution and the second coating solution may be organic matters having different compositions or physical properties. That is, when thin film coating is required, any base member, any first coating liquid, and any second coating liquid may be good.

Figure 3:
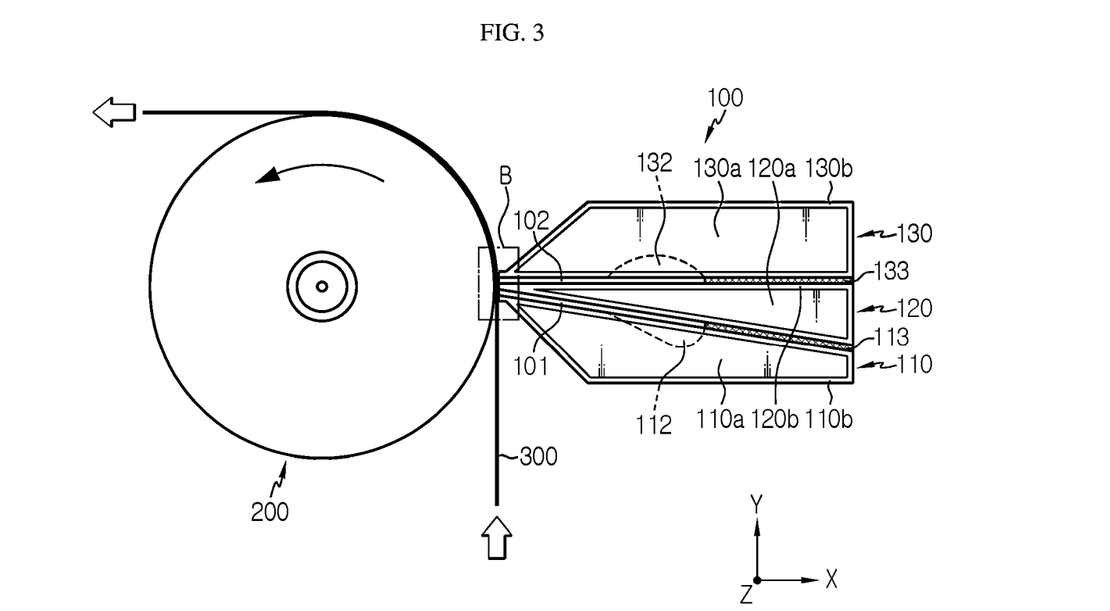
FIG. 3 is a schematic cross-sectional view of a multi-slot die coater according to an embodiment of the present disclosure.
Figure 4:
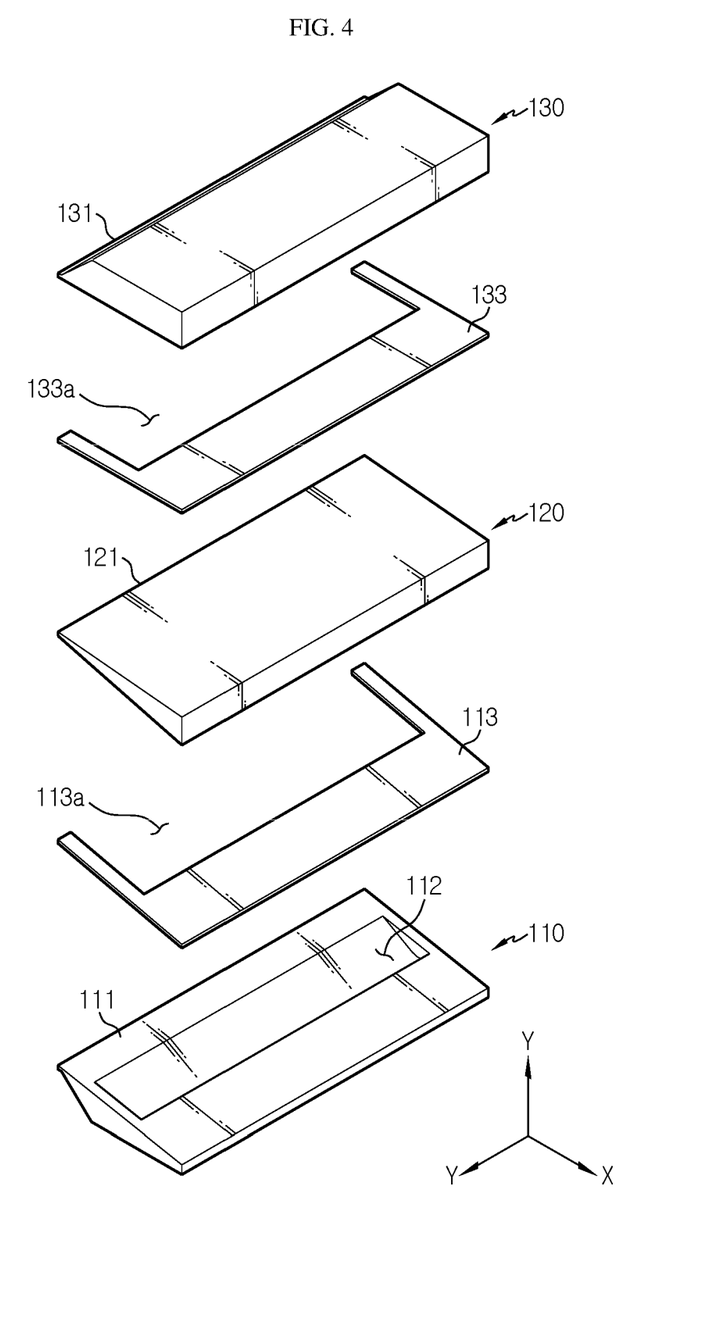
FIG. 4 is a schematic exploded perspective view of a multi-slot die coater according to an embodiment of the present disclosure.
Figure 5:
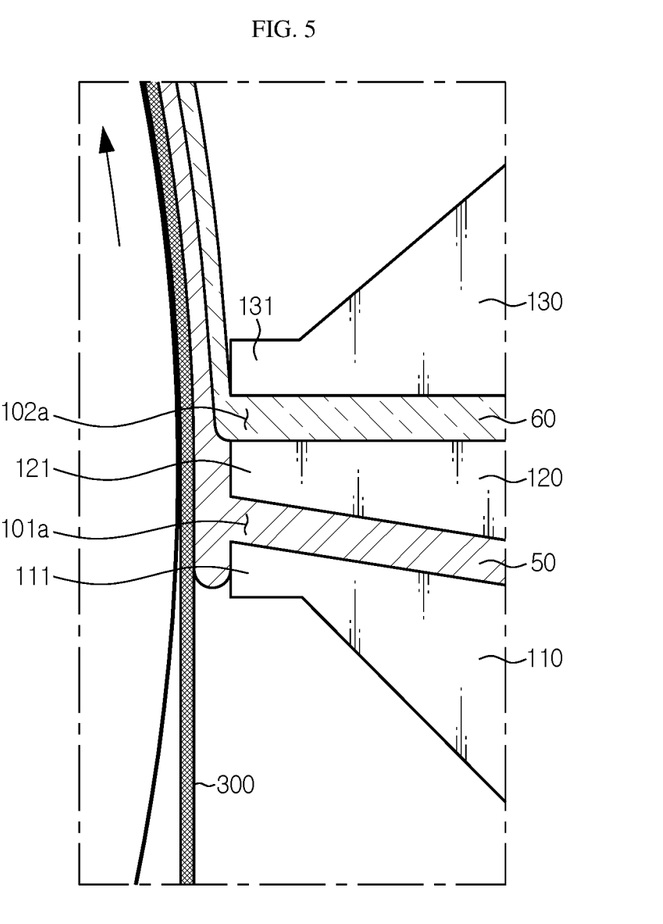
FIG. 5 is an enlarged view of area B of FIG. 3.

FIG. 3 is a schematic cross-sectional view of a multi-slot die coater according to an embodiment of the present disclosure. FIG. 4 is a schematic exploded perspective view of a multi-slot die coater according to an embodiment of the present disclosure. FIG. 5 is an enlarged view of area B of FIG. 3.

A multi-slot die coater 100 according to the present disclosure is a dual slot die coater including a lower slot 101 and an upper slot 102 and is an apparatus capable of simultaneously or alternately coating two types of same or different coating solutions on a base member 300 through the lower slot 101 and the upper slot 102. Referring to FIGS. 3 and 4, the multi-slot die coater 100 includes a lower die block 110, an intermediate die block 120 disposed above an upper portion of the lower die block 110, and an upper die block 130 disposed above an upper portion of the intermediate die block 120. The die blocks 110, 120, and 130 are assembled with each other through a fastening member such as a bolt.

The lower die block 110 is a lowermost block among the blocks constituting the multi-slot die coater 100, and a surface 110b facing the intermediate die block 120 has an inclined shape to form an angle of approximately 30 degrees to 60 degrees with respect to a bottom surface (X-Z plane).

Referring to FIGS. 3 to 5, the lower slot 101 may be formed where the lower die block 110 and the intermediate die block 120 face each other. For example, a first spacer 113 is interposed between the lower die block 110 and the intermediate die block 120 to provide a gap therebetween, so that the lower slot 101 corresponding to a passage through which the first coating solution 50 may flow may be formed. In this case, the thickness of the first spacer 113 determines the vertical width (Y-axis direction and a slot gap) of the lower slot 101. However, conventional die blocks were vulnerable to deformation and torsion, making it difficult to maintain the slot gap.

As shown in FIG. 4, the first spacer 113 includes a first opening portion 113a in which one area is cut and may be interposed in the remaining portion except for one side in a border area of an opposite surface of each of the lower die block 110 and the intermediate die block 120. Accordingly, a lower discharge port 101a through which the first coating solution 50 may be discharged to the outside is formed only between a front end portion of the lower die block 110 and a front end portion of the intermediate die block 120. The front end portion of the lower die block 110 and the front end portion of the intermediate die block 120 are defined as a lower die lip 111 and an intermediate die lip 121, respectively. In other words, the lower discharge port 101a may be formed by making the lower die lip 111 and the intermediate die lip 121 spaced apart from each other.

For reference, the first spacer 113 functions as a gasket to prevent the first coating solution 50 from leaking into a gap between the lower die block 110 and the intermediate die block 120 except for the area where the lower discharge port 101a is formed, and thus the first spacer 113 is preferably made of a material having sealing properties.

The lower die block 110 includes a first manifold 112 having a predetermined depth on a surface facing the intermediate die block 120 and communicatively connected to the lower slot 101. Although not shown, the first manifold 112 is connected to a first coating solution supply chamber (not shown) installed outside through a supply pipe to receive the first coating solution 50. When the first coating solution 50 is filled in the first manifold 112, the flow of the first coating solution 50 is induced along the lower slot 101 and discharged to the outside through the lower discharge port 101a.

The intermediate die block 120 is a block located in the middle of blocks constituting the multi-slot die coater 100, and is a block disposed between the lower die block 110 and the upper die block 130 to form a dual slot. A cross section of the intermediate die block 120 of the present embodiment is a right triangle, but is not necessarily limited to such as shape. For example, the cross section may be provided as an isosceles triangle.

The upper die block 130 is disposed to face an upper surface of the intermediate die block 120 that is horizontal with respect to a bottom surface. The upper slot 102 is thus formed where the intermediate die block 120 and the upper die block 130 face to each other.

Like the lower slot 101 described above, a second spacer 133 may be interposed between the intermediate die block 120 and the upper die block 130 to provide a gap therebetween. Accordingly, the upper slot 102 corresponding to a passage through which a second coating solution 60 may flow is formed. In this case, a vertical width (Y-axis direction and a slot gap) of the upper slot 102 is determined by the second spacer 133. However, conventional die blocks were vulnerable to deformation and torsion, making it difficult to maintain the slot gap.

In addition, the second spacer 133, which also has a structure similar to that of the above-described first spacer 113, includes a second opening portion 133a in which one area is cut, and may be interposed in the remaining portion except for one side in a border area of an opposite surface of each of the intermediate die block 120 and the upper die block 130. Similarly, a circumferential direction of the second spacer 133 except for the front of the upper slot 102 is blocked, and the upper discharge port 102a is formed only between the front end portion of the intermediate die block 120 and a front end portion of the upper die block 130. The front end portion of the upper die block 130 is defined as an upper die lip 131. In other words, the upper discharge port 102a may be formed by making the intermediate die lip 121 and the upper die lip 131 spaced apart from each other.

In addition, the upper die block 130 includes a second manifold 132 having a predetermined depth on a surface facing the intermediate die block 120 and communicatively connected to the upper slot 102. Although not shown in the drawings, the second manifold 132 is connected to a supply chamber of the second coating solution 60 installed outside through a supply pipe to receive the second coating solution 60. When the second coating solution 60 is supplied from the outside along the supply pipe in the shape of a pipe and filled in the second manifold 132, the flow of the second coating solution 60 is induced along the upper slot 102 communicatively connected to the second manifold 132 and discharged to the outside through the upper discharge port 102a.

The upper slot 102 and the lower slot 101 form a certain angle, and the angle may be approximately 30 degrees to 60 degrees. The upper slot 102 and the lower slot 101 may intersect each other at one point, and the upper discharge port 102a and the lower discharge port 101a may be provided near the intersection point. Accordingly, discharge points of the first coating solution 50 and the second coating solution 60 may be concentrated approximately at one point.

The first and second manifolds 112 and 132 are respectively formed in the lower die block 110 and the upper die block 130. In this way, not only may the deformation of the intermediate die block 120 that is structurally most vulnerable be less affected, but also it is possible to implement the structure that enables sliding in the intermediate die block 120 as in the additional embodiment described below.

According to the multi-slot die coater 100 having such a configuration, a rotatably provided coating roll 200 is disposed in front of the multi-slot die coater 100, the base member 300 to be coated by rotating the coating roll 200 is driven, the first coating solution 50 and the second coating solution 60 are continuously contacted with the surface of the base member 300 so that the base member 300 may be coated in a double layer. Alternatively, supply and interruption of the first coating solution 50 and supply and interruption of the second coating solution 60 are alternately performed so that pattern-coating may be intermittently performed on the base member 300.

At least one of the lower die block 110, the intermediate die block 120, and the upper die block 130 includes metal coating layers 110b, 120b and 130b on ceramic bodies 110a, 120a, and 130a. Although the present embodiment is described by way of an example in which all of the lower die block 110, the intermediate die block 120, and the upper die block 130 include metal coating layers on ceramic bodies, only the lower die block 110, only the intermediate die block 120, or only the upper die block 130 may include a metal coating layer on a ceramic body, and only the lower die block 110 and the upper die block 130 may include metal coating layers on ceramic bodies.

The multi-slot die coater 100 extrudes and applies a coating solution on a surface of a continuously traveling base member 300 through at least one of a lower slot 101 and an upper slot 102. Since at least a portion adjacent to a portion from which the coating solution is discharged among the lower die block 110, the intermediate die block 120, and the upper die block 130 is most affected by extrusion of the coating solution, in particular, when the portion includes the metal coating layers 110*b*, 120*b*, and 130*b* in the ceramic bodies 110*a*, 120*a*, and 130*a*, deformation of the slot gap may be reduced. That is, it is good if the portion to which pressure by the coating solution is applied when the coating solution is discharged, specifically, a portion of the upper die lip 131, the intermediate die lip 121, or the lower die lip 111 or a portion adjacent thereto, includes the metal coating layers 110*b*, 120*b*, and 130*b* on the ceramic bodies 110*a*, 120*a*, and 130*a*. It is good if the ceramic bodies 110*a*, 120*a*, and 130*a* may constitute the whole of the lower die block 110, the intermediate die block 120, and the upper die block 130. When it is difficult to manufacture the ceramic bodies 110*a*, 120*a*, and 130*a* to have the thin and sharp die lips 131, 121, and 111, it is also possible to form the ceramic bodies 110*a*, 120*a*, and 130*a* up to just before the die lips 131, 121, and 111, and form the die lips 131, 121, and 111 entirely with the metal coating layer 110*b*, 120*b*, and 130*b*.

The metal coating layers 110*b*, 120*b*, and 130*b* may partially or wholly cover the ceramic bodies 110*a*, 120*a*, and 130*a*. In other words, the metal coating layers 110*b*, 120*b*, and 130*b* are formed at least on a lip portion, but it is good if the metal coating layers 110*b*, 120*b*, and 130*b* are formed on other portions, for example, inner portions of the slots 101 and 102 in contact with the coating solutions 50 and 60, and a land (an area from a manifold to a discharge port).

Here, it is preferable that the ceramic constituting the ceramic bodies 110*a*, 120*a*, and 130*a* is a transition metal oxide, and the metal constituting the metal coating layer 110*b*, 120*b*, and 130*b* is SUS.

As the transition metal oxide, for example, a zirconia ($ZrO_2$) system is used. The ceramic bodies 110*a*, 120*a*, and 130*a* may be obtained by sintering mixed powder including a single raw material of a purity equal to or greater than 90% and other sintering aids at a high temperature equal to or greater than 1000° C. A mixed powder molding body for the ceramic bodies 110*a*, 120*a*, and 130*a* may be obtained through slip casting or press molding. By using CIP, molding and sintering may be performed simultaneously. As the ceramic constituting the ceramic bodies 110*a*, 120*a*, and 130*a*, alumina ($Al_2O_3$), silicon nitride ($Si_3N_4$), silicon carbide (SiC), or silica ($SiO_2$), which is commonly called structural ceramics, may be used.

Since surfaces of the ceramic bodies 110*a*, 120*a*, and 130*a* obtained by sintering have high roughness, the metal coating layers 110*b*, 120*b*, and 130*b* are formed on the surfaces to form a smooth surface. A method of forming the metal coating layers 110*b*, 120*b*, and 130*b* may be dipping, thermal spraying, simple lamination, etc. Although ceramic and metal are different materials, ceramic and metal may be coated without fear of peeling, such as considering the difference in thermal expansion coefficient upon coating the metal. In addition, the present disclosure also proposes means for preventing peeling.

For example, a $ZrO_2$-based ceramic has a melting point of about 2700° C. The melting point of a steel material such as SUS is about 1500 to 1600° C. When the ceramic bodies 110*a*, 120*a*, and 130*a* are dipped into a molten steel material, the metal coating layers 110*b*, 120*b*, and 130*b* may be formed on the entire surface of the ceramic bodies 110*a*, 120*a*, and 130*a*. At this time, an underlayer for improving an interface bonding ability with the metal coating layers 110*b*, 120*b*, and 130*b* may be first formed on the surfaces of the ceramic bodies 110*a*, 120*a*, and 130*a* before dipping. Also, after the metal coating layers 110*b*, 120*b*, and 130*b* are formed, some metal coating layers 110*b*, 120*b*, and 130*b* are removed from the portion that is not related to discharge of the coating solution so that the surfaces of the ceramic bodies 110*a*, 120*a*, and 130*a* are partially exposed, and then, a material (e.g., a dielectric substance such as $SiO_2$) having a ceramic-material bonding strength superior to a ceramic-material bonding strength is further formed on the ceramic bodies 110*a*, 120*a*, and 130*a* having the exposed surfaces and the metal coating layers 110*b*, 120*b*, and 130*b* therearound to strongly coupling the material and the ceramic bodies 110*a*, 120*a*, and 130*a*, and thus a structure and method for preventing the metal coating layers 110*b*, 120*b*, and 130*b* sandwiched therebetween from being peeled off are also possible.

Materials that are easy to process, such as SUS420J2, SUS630, SUS440C, SUS304, and SUS316L, may be used as SUS. SUS may be easy to process, inexpensive, has high corrosion resistance, and may be coated in a desired shape at low cost. The metal coating layers 110*b*, 120*b*, and 130*b* may have a thickness of 0.1 to 30 mm. If the thickness is less than 0.1 mm, it may be difficult to coat a metal having a uniform thickness. If the thickness exceeds 30 mm, the effect of applying ceramic may not be maximized considering a proportion occupied by the ceramic in the total volume.

Ceramics have high strength, high wear resistance, and are very hard compared to metals, which are existing materials, but are lightweight compared to metals. When the body of the lower die block 110, the intermediate die block 120, or the upper die block 130 is fired with a ceramic (transition metal oxide) material, the body is resistant to torsion and deformation. However, since ceramic is highly brittle and easily cracks on the surface, it may be difficult to use the ceramic alone for a long period of time. In addition, since ceramics are usually manufactured by sintering small powder particles, it may be difficult to have a smooth surface due to the shape of particles and micro holes (a high roughness). Accordingly, in the present disclosure, by forming the metal coating layers 110*b*, 120*b*, and 130*b* on the ceramic bodies 110*a*, 120*a*, and 130*a*, process stabilization by a uniform application is realized by maintaining the property of ceramic that is resistant to torsion and deformation while the effect of preventing cracking and lowering illuminance is achieved. In addition, since the ceramic bodies 110*a*, 120*a*, and 130*a* are brittle materials, it may be difficult to process a delicate shape of an edge portion or a sharp corner portion. In such a case, the ceramic bodies 110*a*, 120*a*, and 130*a* are sintered into a bulk shape to the extent that they serve as a frame, and then the metal coating layers 110*b*, 120*b*, and 130*b* formed thereon are processed so that the edge portion, that is, a delicate shape of the upper die lip 131, the intermediate die lip 121 or the lower die lip 111, and the sharp corner portion may be obtained. Accordingly, the edge portion having an ideal coating performance may be obtained. Furthermore, by achieving weight lightening, handling is easy, and down power capacity and compactification of an entire device may be possible.

According to the present disclosure, the multi-slot die coater 100 in which a metal is coating on a body made of a ceramic material which has a better deformation and torsion phenomenon than that of the metal is provided. In the dual slot die coater 100, a slot gap is less changed according to the bolt fastening strength when the die blocks 110, 120, and 130 are assembled, and an effect of maintaining the slot gap once adjusted is excellent. Since deformation or torsion of a die block which is structurally vulnerable is improved through a change in the material, it is possible to uniformly form a coating layer, in particular, an electrode active material layer, to a desired thickness, and simultaneous coating of two types of electrode active material slurries is possible, and thus there are effects that both performance and productivity are excellent.

According to an aspect of the present disclosure, it is possible to improve durability by preventing twisting and deformation of the die block of the multi-slot die coater having a relatively thin thickness compared to the conventional slot die coater including one slot. This has the effect of securing coating process ability and securing reproducibility.

When the multi-slot die coater of the present disclosure is used to manufacture an electrode of a secondary battery by applying the electrode active material slurry on a current collector, there is an advantage that uniform coating is possible even under high-speed or long-width application conditions.

Meanwhile, in the present embodiment, the case of applying the coating solution in two layers or the case of performing pattern-coating by alternately supplying the coating solution has been described as an example, but it will be understood without separate explanation that it is also applied to the case where two types of coating solutions join in the middle of a slot rather than discharge through an individual slot or the case where three or more layers are simultaneously applied by providing three or more slots. It will be understood without detailed explanation that four or more die blocks are required to provide three or more slots.

Figure 6:
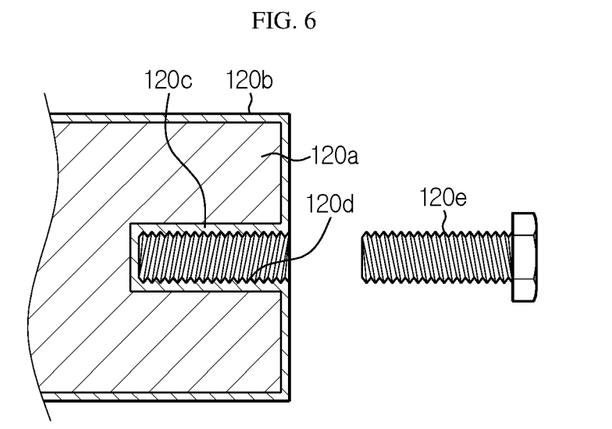
FIG. 6 is a schematic cross-sectional view illustrating a configuration of a fastening portion for assembling in a multi-slot die coater according to an embodiment of the present disclosure.

FIG. 6 is a schematic cross-sectional view illustrating a configuration of a fastening portion for assembling in a multi-slot die coater according to an embodiment of the present disclosure.

As mentioned above, bolt fastening is used when the die blocks 110, 120, and 130 are assembled. Since ceramic is highly brittle, if bolt fastening is directly made to the ceramic, stress due to a bolt torque accumulates, and cracks may occur in the ceramic during long-term use. For this reason, in the present disclosure, a fastening part is also improved as shown in FIG. 6.

Referring to FIG. 6, a groove 120c is formed in the ceramic body 120a for bolt tap processing for bolt fastening, and the metal coating layer 120b is filled in the groove 120c. A bolt tab 120d is formed in the metal coating layer 120b filled in the groove 120c. Then, even when a bolt 120e is fastened to the bolt tab 120d, the bolt tab 120d absorbs the bolt torque and does not affect the ceramic body 120a. In this way, a portion constituting a mechanical body is made of ceramic, and a surface or the fastening part is made of metal to compensate for brittleness of the ceramic. Although only the ceramic body 120a of the intermediate die block 120 has been described in FIG. 6, the improvement of the fastening part as described above may be equally performed on the lower die block 110 and the upper die block 130.

The fastening parts may be formed at regular intervals in a Z direction in each of the dies 130, 120, and 110. When each of the die blocks 110, 120, and 130 has a large size, the fastening parts may be also formed at regular intervals in a Y direction. The groove 120c and the bolt tab 120d described with reference to FIG. 6 are formed in the fastening parts. A fastening member may include a fixing plate having a size covering a plurality of bolt tabs 120d between the die blocks 110, 120, and 130 and including holes corresponding to the bolt tabs 120d, and bolts 120 passing through the holes of the fixing plate and fastened to the respective bolt tabs 120d.

For example, since one fixing plate has a size to cover the bolt tab 120d formed in the upper die block 130 and the bolt tab 120d formed in the intermediate die block 120, when the plate is placed between the two die blocks 130 and 120 and the bolt 120e passes through each hole and fastened to the bolt tab 120d, the upper die block 130 and the intermediate die block 120 are fastened through the fixing plate.

Meanwhile, in the multi-slot die coater 100 according to the present disclosure, the upper die lip 131 may be provided in a shape in which a corner portion opposite to the intermediate die lip 121 is chamfered. According to a chamfered structure of the upper die lip 131, it is possible to reduce a leaking phenomenon which is a problem in the conventional double-layer slot coating process.

Figure 7:
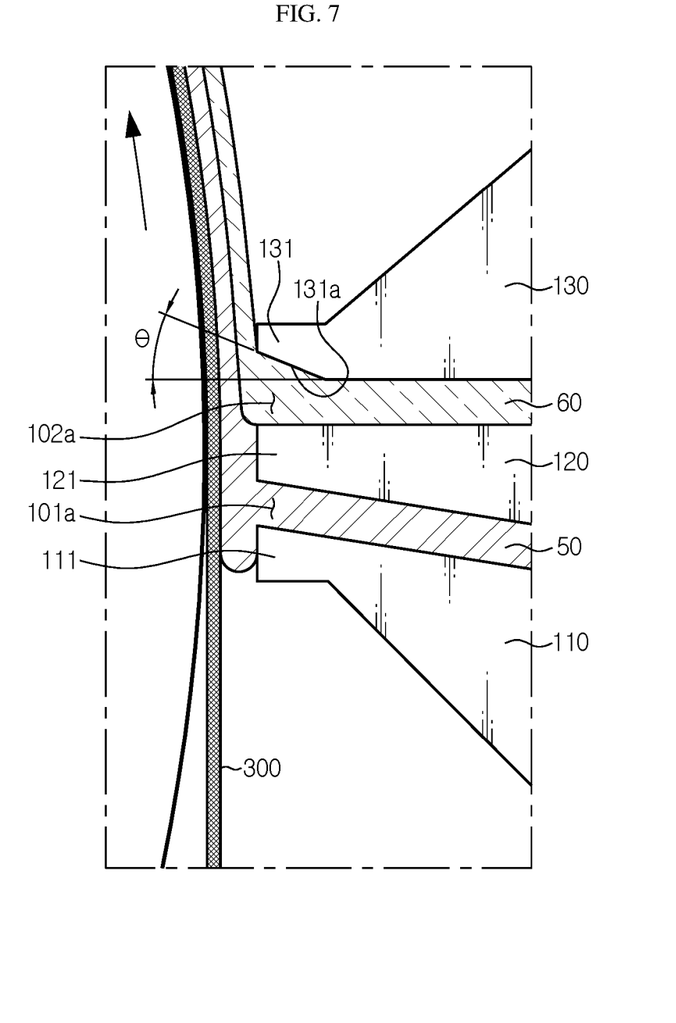
FIG. 7 is an enlarged view illustrating a multi-slot die coater according to another embodiment of the present disclosure, after modification of area B of FIG. 3.

In this regard, a die lip structure for reducing leaking of a multi-slot die according to another embodiment of the present disclosure will be described in detail with reference to FIG. 7. FIG. 7 is an enlarged view illustrating a multi-slot die coater according to another embodiment of the present disclosure, after modification of the area B of FIG. 3.

As in FIG. 7, the upper die lip 131 of the multi-slot die coater 100 according to another embodiment of the present disclosure includes an inclined surface 131a by cutting a corner area from one point to the end. The angle θ of the inclined surface 131a may be designed within a range of approximately 10 degrees to 80 degrees. For this reason, the upper discharge port 102a gradually expands from one point as the width thereof is closer to the outside. In other words, the upper discharge port 102a of the present embodiment may be provided to gradually expand in a rotational direction (a lower stream direction) of the coating roll 200.

For reference, in slot coating, leaking is induced when a coating solution discharged from a die lip collides with the surface of the base member 300, the flow of the coating solution in an upstream direction (a direction opposite to the rotational direction of the coating roll 200) is instantaneously strong. A degree of this leaking phenomenon is different depending on a coating gap (a gap between the coating roll and the die lip), a flow rate or viscosity of the coating solution, etc. However, in the case of double-layer slot coating, since the second coating solution 60 discharged from the upper discharge port 102a contacts on the first coating solution 50 in a state in which the first coating solution 50 discharged from the lower discharge port 101a first contacts the surface of the base member 300, at this time, the flow in the upstream direction is stronger due to the discharge pressure of the second coating solution 60 applied to the first coating solution 50, and the leaking phenomenon is further intensified.

In order to reduce this leaking phenomenon, in the present embodiment, the upper discharge port 102a was gradually expanded by applying a chamfer structure to the upper die lip 131 so that a contact area is wider at the moment when the second coating solution 60 comes into contact with the first coating solution 50. In this case, since the pressure applied to the first coating solution 50 is dispersed and relieved due to the second coating solution 60, the strength of flow of the first coating solution 50 in the upstream direction may be reduced.

In addition, since the second coating solution 60 may be incident obliquely along the inclined surface 131a of the upper die lip 131 with respect to the surface of the base member 300, the flow of the second coating solution 60 together with the first coating solution 50 may be stronger in a downstream direction (the rotational direction of the coating roll 200, +Y axis direction) and thus leaking may be reduced.

According to another aspect of the present disclosure, by dispersing the pressure of an upper coating solution by applying a chamfer structure to an upper die lip, it is possible to improve the leakage phenomenon toward a lower die lip, thereby improving the coating quality of a product.

Next, still another embodiment of the present disclosure will be described with reference to FIGS. 8 and 9. The same reference numerals as in the above-described embodiment denote the same members, and redundant descriptions of the same members will be omitted, and differences from the above-described embodiment will be mainly described.

In the above-described embodiment, the intermediate die block 120 includes one block, so that relative positions of the upper discharge port 102a and the lower discharge port 101a may not be variably adjusted, but according to another embodiment of the present disclosure, the relative positions of the upper discharge port 102a and the lower discharge port 101a may be easily adjusted.

To this end, in a multi-slot die coater 100' according to still another embodiment of the present, the intermediate die block 120 includes a first intermediate die block 122 and a second intermediate die block 124, and the first intermediate die block 122 and the second intermediate die block 124 face-to-face contact with each other up and down, but slide along a contact surface to be movable relative to each other. And, the first intermediate die block 122 is fixedly coupled to the lower die block 110 by bolt coupling, etc., and the second intermediate die block 124 is fixedly coupled to the upper die block 130 by bolt coupling, etc. Accordingly, the first intermediate die block 122 and the lower die block 110 may move integrally, and the second intermediate die block 124 and the upper die block 130 may move integrally.

In the multi-slot die coater 100', if necessary, the two discharge ports 101a and 102a may be spaced apart from each other in a horizontal direction to be arranged back and forth.

Figure 8:
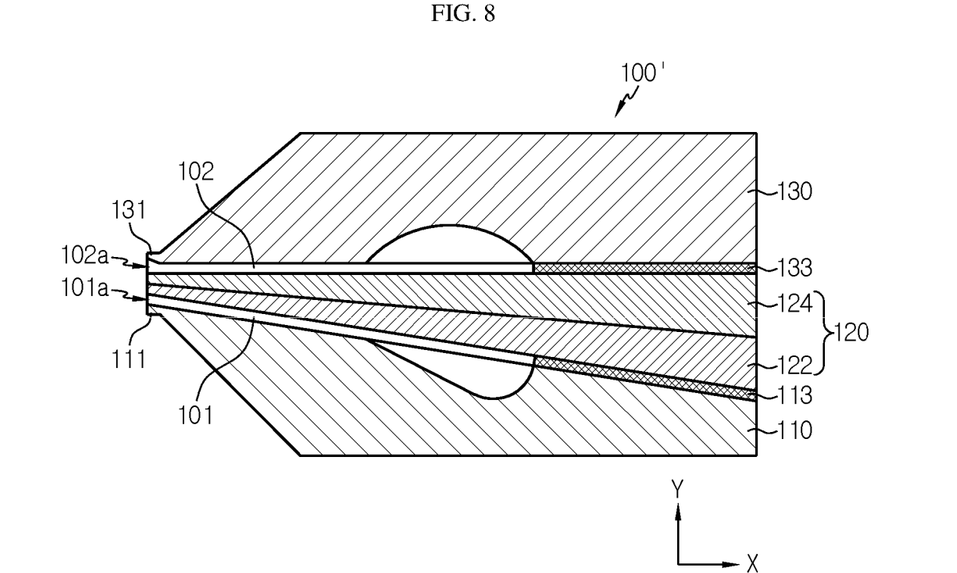
FIG. 8 is a cross-sectional view of a multi-slot die coater according to still another embodiment of the present disclosure.
Figure 9:
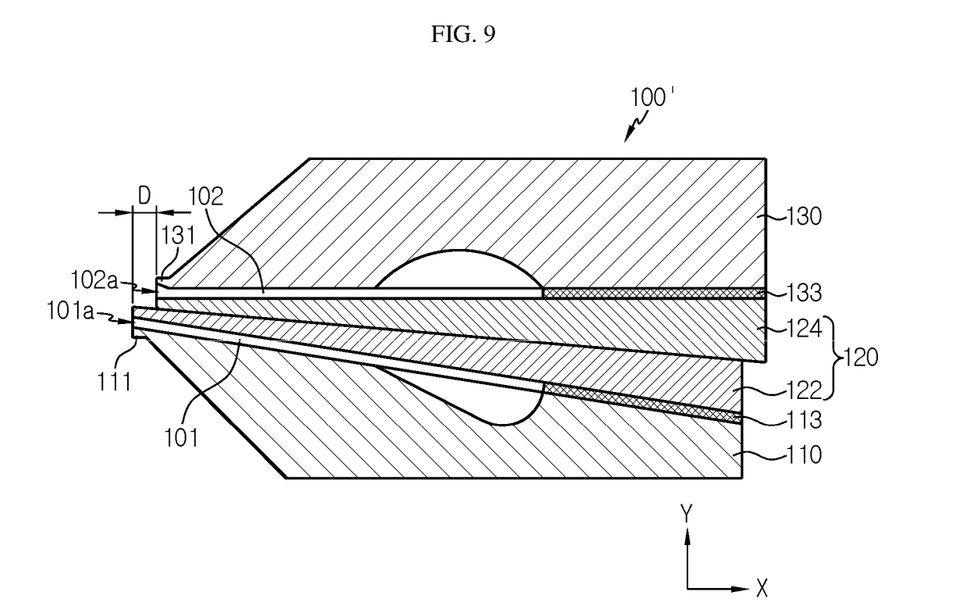
FIG. 9 is a diagram illustrating a case in which a positional difference between an upper discharge port and a lower discharge port occurs due to a relative movement between a lower die block and an upper die block in the multi-slot die coater of FIG. 8.

That is, as shown in FIGS. 8 and 9, a separate apparatus for adjusting the shape of the multi-slot die coater 100' is used, or an operator may make the relative movement of the lower die block 110 and the upper die block 130 by hand.

For example, in a state where the lower die block 110 does not move and is left as it is, a step between the lower discharge port 101a and the upper discharge port 102a may be formed by moving the upper die block 130 along a sliding surface by a certain distance D backward or forward opposite to a discharge direction of the coating solutions 50 and 60. Here, the sliding surface means an opposite surface of the first intermediate die block 122 and the second intermediate die block 124.

The width D of the step formed as described above may be determined within the range of approximately several hundred micrometers to several millimeters, which may be determined according to the physical properties and viscosity of the first coating solution 50 and the second coating solution 60 formed on the base member 300, or a desired thickness for each layer on the base member 300. For example, as the thickness of a coating layer to be formed on the base member 300 increases, a numerical value of the width D of the step may increase.

In addition, as the lower discharge port 101a and the upper discharge port 102a are arranged at positions spaced apart from each other in the horizontal direction, there is no concern that the second coating solution 60 discharged from the upper discharge port 102a flows into the lower discharge port 101a or the first coating solution 50 discharged from the lower discharge port 101a flows into the upper discharge port 102a.

That is, there is no concern that the coating solution discharged through the lower discharge port 101a or the upper discharge port 102a is blocked by a surface forming the step formed between the lower discharge port 101a and the upper discharge port 102a and flows into the other discharge port, whereby a more smooth multi-layer active material coating process may proceed.

The multi-slot die coater 100' according to another embodiment of the present disclosure as described above may be adjusted simply by the sliding movement of the lower die block 110 and/or the upper die block 130, in a case where the relative position between the lower discharge port 101a and the upper discharge port 102a needs to be changed, and there is no need to disassemble and reassemble each of the die blocks 110, 120, and 130, and thus process ability may be greatly improved.

According to another aspect of the present disclosure, the process ability of multi-slot coating may be improved by easily adjusting positions of upper and lower discharge ports by relatively moving upper and lower die blocks according to coating process conditions.

Meanwhile, for the convenience of illustration, the ceramic bodies and the metal coating layers are not shown separately in FIGS. 7 to 9 relating to the additional embodiment, but the description of the first embodiment is applied as it is in this regard. In particular, it will be appreciated that the improvement of the fastening part as described with reference to FIG. 6 may be applied to bolt coupling between the first intermediate die block 122 and the lower die block 110 and bolt coupling between the second intermediate die block 124 and the upper die block 130.

Hereinafter, a double slot die coater made of only metal according to the conventional art is described as a comparative example, and the effect of the double slot die coater including the metal coating layers on the ceramic bodies according to the present disclosure is indirectly described.

As mentioned above, the original dual slot die coater is structurally vulnerable to deformation and torsion due to a thin thickness of each die block. When the size of the die block is increased (change in the angle), the discharge direction is changed, which causes a problem in deterioration of coating process ability.

In the conventional dual slot die coater made of only metal, in order to confirm the influence of a slot inclination due to the change in the angle of the die block on the coating stability, the upper slot and the lower slot were analyzed by inclining each of the upper slot and the lower slot by 30 degrees in a direction away from the intermediate die block.

Figure 10:
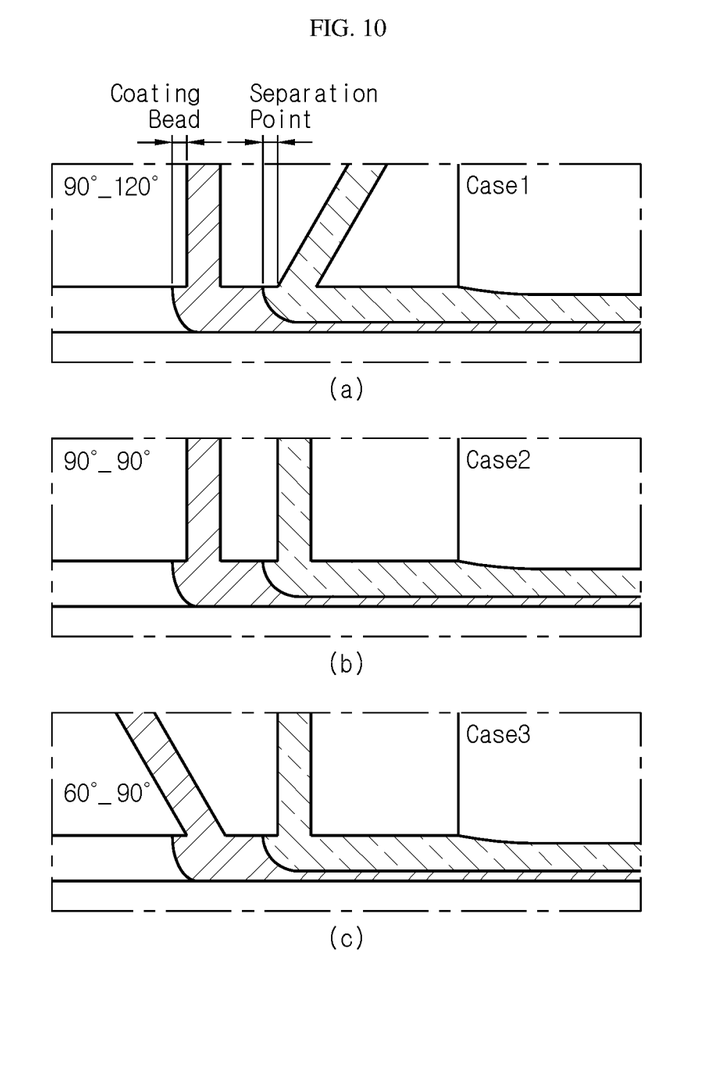
FIG. 10 shows a coating aspect according to a change in an angle of a die block in a comparative example.

Case 1 is that the upper slot has an angle of 120 degrees with respect to a surface of a base member and the lower slot has an angle of 90 degrees with respect to the surface of the base member by inclining the upper slot by 30 degrees, Case 2 is that all slots are upright so that each of the upper slot and the lower slot has an angle of 90 degrees, and Case 3 is that the upper slot has an angle of 90 degrees and the lower slot has an angle of 60 degrees by inclining the lower slot by 30 degrees. A state of each of coating layers is as shown in FIG. 10. Positions of a coating bead and a separation point are shown in FIG. 10. FIG. shows the coating aspect according to the change in the angle of the die block in a comparative example. In FIG. 10, (a), (b), and (c) represent case 1, case 2, and case 3, respectively.

The positions of the coating bead and the separation point for each case are summarized in Table 1.

TABLE 1

| | Angle of lower slot | Angle of upper slot | Position of coating bead (μm) | Position of separation point (μm) |
|---|---|---|---|---|
| Case 1 | 90 degrees | 120 degrees | 165 | 102 |
| Case 2 | 90 degrees | 90 degrees | 115 | 62 |
| Case 3 | 60 degrees | 90 degrees | 49 | 61 |

Coating stability may be determined by the positions of the coating bead and the separation point.

As a result of changing the angle of the upper slot and the angle of the lower slot as described above, as to the coating stability, case 2 was the same as or better than case 3 and case 1 was the worst (case 2≥case 3>case 1). Compared to case 2 in which all slots are upright, case 1 and case 2 relate to a V-shaped solution supply method by inkling either slot. Such a solution supply method has a problem in that it is difficult to form a double layer because intermixing occurs due to vortex formation in a region where upper and lower slurries meet. When the size of the die block is increased and the angle is changed as described above, the discharge direction is changed, which causes deterioration of coating process ability.

As to deformation vulnerability, case 1 and case 3 were similar, and were very vulnerable compared to case 2 (case 1=case 3>>case 2). That is, when the angle is changed as in case 1 and case 3, the intermediate die block is too thin to be vulnerable. That is, even if deformation and torsion are improved by increasing thicknesses of the upper/lower die blocks located outside among the three die blocks, it is still difficult to compensate for the deformation of the structurally most vulnerable intermediate die block. Therefore, it may be seen that it is difficult to improve deformation and torsion by a change in the structure unless a change is made to the metal material constituting the existing die block. In the present disclosure, since the ceramic bodies having excellent resistance to deformation and torsion are used, torsion and deformation may be minimized without changing the angle of the die block compared to the comparative example.

Figure 11:
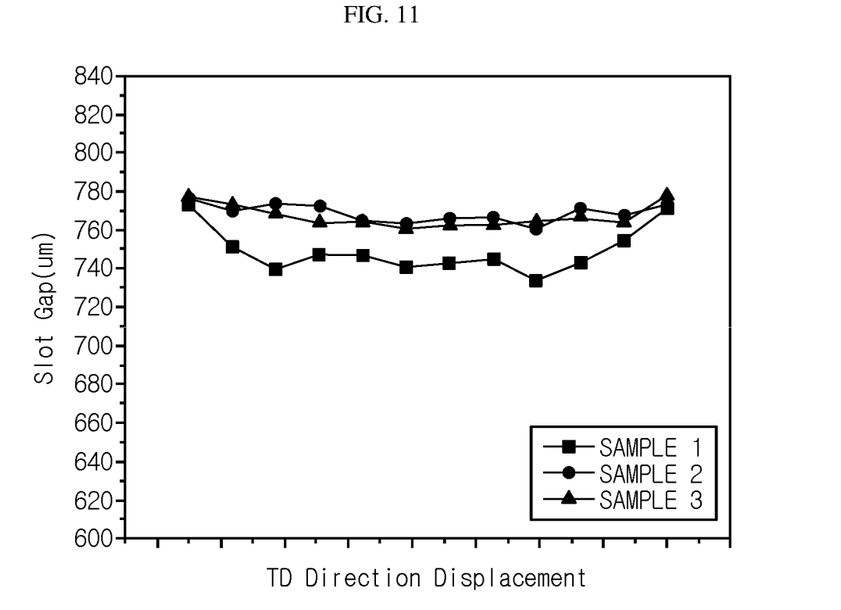
FIG. 11 is a graph of a slot gap in a TD according to a fastening strength in the comparative example.

In the conventional dual slot die coater made of only metal, slot gaps (the size of a discharge port between the upper die block and the intermediate die block, that is, a gap of the upper slot) according to respective bolt fastening strengths when assembling the upper die block and the intermediate die block are measured in the TD (the width direction of the die block perpendicular to a traveling direction) and are summarized in FIG. 11 and Table 2. FIG. 11 is a graph of a change in the slot gap in the TD according to the fastening strength in the comparative example. In the graph, the X-axis represents a TD direction displacement measured from one end of the die block, and the Y-axis represents the size of the slot gap.

TABLE 2

| | Bolt Torque (N) | Slot gap Maximum (μm) | Slot gap Minimum (μm) | Maximum-Minimum (μm) |
|---|---|---|---|---|
| Sample 1 | 350 | 773 | 734 | 39 |
| Sample 2 | 150 | 777 | 760 | 13 |
| Sample 3 | 200 | 778 | 761 | 12 |

Upon assembling the upper die block and the intermediate die block as in sample 1, when the bolt torque of 350N is used, a maximum-minimum difference of the slot gap is 39 μm. When the fastening strength is changed to 150N and 200N in the order of samples 2 and 3, the maximum-minimum difference is reduced to 13 μm and 12 μm. As described above, in the related art, the change in the slot gap is easy according to the fastening strength. Conventionally, even if the fastening strength was set at 200N and tightly managed to assemble the upper die block and the intermediate die block, the maximum-minimum difference of 12 μm had to be endured. However, in the present disclosure, since the ceramic bodies having excellent resistance to deformation and torsion are used, there is no concern that there will be a big maximum-minimum difference of the slot gap according to the fastening strength compared to the comparative example.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, although terms indicating directions such as up, down, left, and right are used in the present specification, these terms are only for convenience of description, and it is apparent to those skilled in the art that these terms may vary depending on a position of a target object or a position of an observer.

What is claimed is:

1. A multi-slot die coater comprising:
a lower slot and an upper slot;
a lower die block;
an intermediate die block disposed above the lower die block to form the lower slot therebetween; and
an upper die block disposed above the intermediate die block to form the upper slot therebetween,
wherein at least one of the lower die block, the intermediate die block, and the upper die block comprises a metal coating layer on a ceramic body, and
wherein the multi-slot die coater is configured to extrude and apply a coating solution on a surface of a continuously traveling base member through at least one of the lower slot and the upper slot,
the metal coating layer is disposed on an inner portion of at least one of the lower and upper slots to at least partially contact the coating solution, and
the metal coating layer entirely covers a land of at least one of the lower and upper slots.

2. The multi-slot die coater of claim 1,
wherein a groove is formed in the ceramic body adapted for bolt tap processing for bolt fastening, the metal coating layer is filled in the groove, and a bolt tap is formed in the metal coating layer filled in the groove.

3. The multi-slot die coater of claim 1,
wherein the lower die block, the intermediate die block, and the upper die block respectively comprise a lower die lip, an intermediate die lip, and an upper die lip forming front end portions thereof, and at least one of the lower die lip, the intermediate die lip, and the upper die lip comprises the metal coating layer on the ceramic body.

4. The multi-slot die coater of claim 1, wherein the ceramic is a transition metal oxide and the metal is SUS.

5. The multi-slot die coater of claim 3, wherein a corner portion of the upper die lip opposed to the intermediate die lip is chamfered.

6. The multi-slot die coater of claim 5, wherein the corner portion of the upper die lip is provided in a shape cut obliquely at an angle of 10 degrees to 80 degrees from a horizontal plane so that the upper die lip comprises an inclined surface.

7. The multi-slot die coater of claim 1, wherein an angle formed by the lower slot and the upper slot is 30 degrees to 60 degrees.

8. The multi-slot die coater of claim 1,
wherein the intermediate die block comprises a first intermediate die block and a second intermediate die block in face-to-face contact with each other up and down and sliding along a contact surface to be movable relative to each other, and
wherein the first intermediate die block is fixedly coupled to the lower die block, and the second intermediate die block is fixedly coupled to the upper die block.

9. The multi-slot die coater of claim 1,
wherein the lower die block, the intermediate die block, and the upper die block respectively comprise a lower die lip, an intermediate die lip, and an upper die lip forming front end portions thereof, a lower discharge port communicatively connected to the lower slot is formed between the lower die lip and the intermediate die lip, and an upper discharge port communicatively connected to the upper slot is formed between the intermediate die lip and the upper die lip, and a predetermined step is formed between the lower discharge port and the upper discharge port.

10. The multi-slot die coater of claim 1, further comprising:
a first spacer interposed between the lower die block and the intermediate die block configured to adjust a width of the lower slot, and
a second spacer interposed between the intermediate die block and the upper die block configured to adjust a width of the upper slot.

11. The multi-slot die coater of claim 1,
wherein the lower die block comprises a first manifold configured to accommodate a first coating solution and communicatively connected to the lower slot, and the upper die block comprises a second manifold configured to accommodate a second coating solution and communicatively connected to the upper slot.

* * * * *